(12) United States Patent
Teel et al.

(10) Patent No.: US 7,794,131 B2
(45) Date of Patent: Sep. 14, 2010

(54) LIGHT STRUCTURE FOR ATTACHMENT TO INPUT/OUTPUT DEVICE

(76) Inventors: John C. Teel, P.O. Box 1426, Homer, AK (US) 99603-1426; Jessica E. Teel, P.O. Box 1426, Homer, AK (US) 99603-1426

( * ) Notice: Subject to any disclaimer, the term of this patent is extended or adjusted under 35 U.S.C. 154(b) by 0 days.

(21) Appl. No.: 11/852,171

(22) Filed: Sep. 7, 2007

(65) Prior Publication Data
US 2008/0062716 A1 Mar. 13, 2008

Related U.S. Application Data

(60) Provisional application No. 60/842,964, filed on Sep. 8, 2006.

(51) Int. Cl.
*F21V 33/00* (2006.01)
(52) U.S. Cl. .................. 362/647; 362/646
(58) Field of Classification Search .............. 362/800, 362/600, 154, 157, 162, 175, 640, 641, 646, 362/647, 285, 287, 288
See application file for complete search history.

(56) References Cited

U.S. PATENT DOCUMENTS

| | | | |
|---|---|---|---|
| 4,598,340 A * | 7/1986 | Dwosh et al. ............ 362/98 |
| 4,949,230 A | 8/1990 | Burmeister |
| 5,003,441 A | 3/1991 | Crowe et al. |
| 5,072,345 A | 12/1991 | Goggia |
| 5,183,325 A | 2/1993 | Hurdle |
| 5,203,622 A | 4/1993 | Sottile |
| 5,280,416 A * | 1/1994 | Hartley et al. ........... 362/98 |
| 5,379,201 A | 1/1995 | Friedman |
| 5,564,814 A | 10/1996 | Anderson |
| 5,868,487 A | 2/1999 | Polley et al. |
| 6,161,944 A | 12/2000 | Leman |
| 6,336,727 B1 | 1/2002 | Kim |
| 6,402,337 B1 * | 6/2002 | LeVasseur et al. ....... 362/153.1 |
| 6,619,813 B1 * | 9/2003 | Schnell .................. 362/116 |
| 7,425,082 B1 * | 9/2008 | Jones .................... 362/285 |

* cited by examiner

*Primary Examiner*—Anabel M Ton
(74) *Attorney, Agent, or Firm*—Lawrence R. Oremland, P.C.

(57) ABSTRACT

A new and useful illumination device, designed especially for input/output panels that are often operated in less than favorable ambient lighting conditions, is provided. The illumination device is designed to be integrally connected with an input/output panel and is selectively actuatable to a condition in which it directs light over a predetermined portion of the panel. When actuated, the illumination device is effective to direct light at the panel that illuminates the entire panel, or at least a predetermined portion of the panel that is sufficient to enable the user to fully operate the panel. The illumination device is particularly useful with portable input/output panels (i.e. input/output panels such as (a) remote controls, (b) PDA's, (c) laptop computers, (d) cell phones, etc. that are intended to be carried about by a user and operated in the ambient lighting conditions about the user). In addition, the illumination device is particularly configured as an "aftermarket" type of device, which can be selectively attached to an input/output panel, and configured to easily, effectively and conveniently direct light to illuminate a predetermined area of the input/output panel. Still further, the illumination device is designed to be compact, easy and efficient to attach to the panel and to operate, effective to illuminate the panel (or at least the part of the panel that needs to be illuminated in order for the panel to be conveniently operated, and is designed to be cost efficient to commercially exploit).

15 Claims, 6 Drawing Sheets

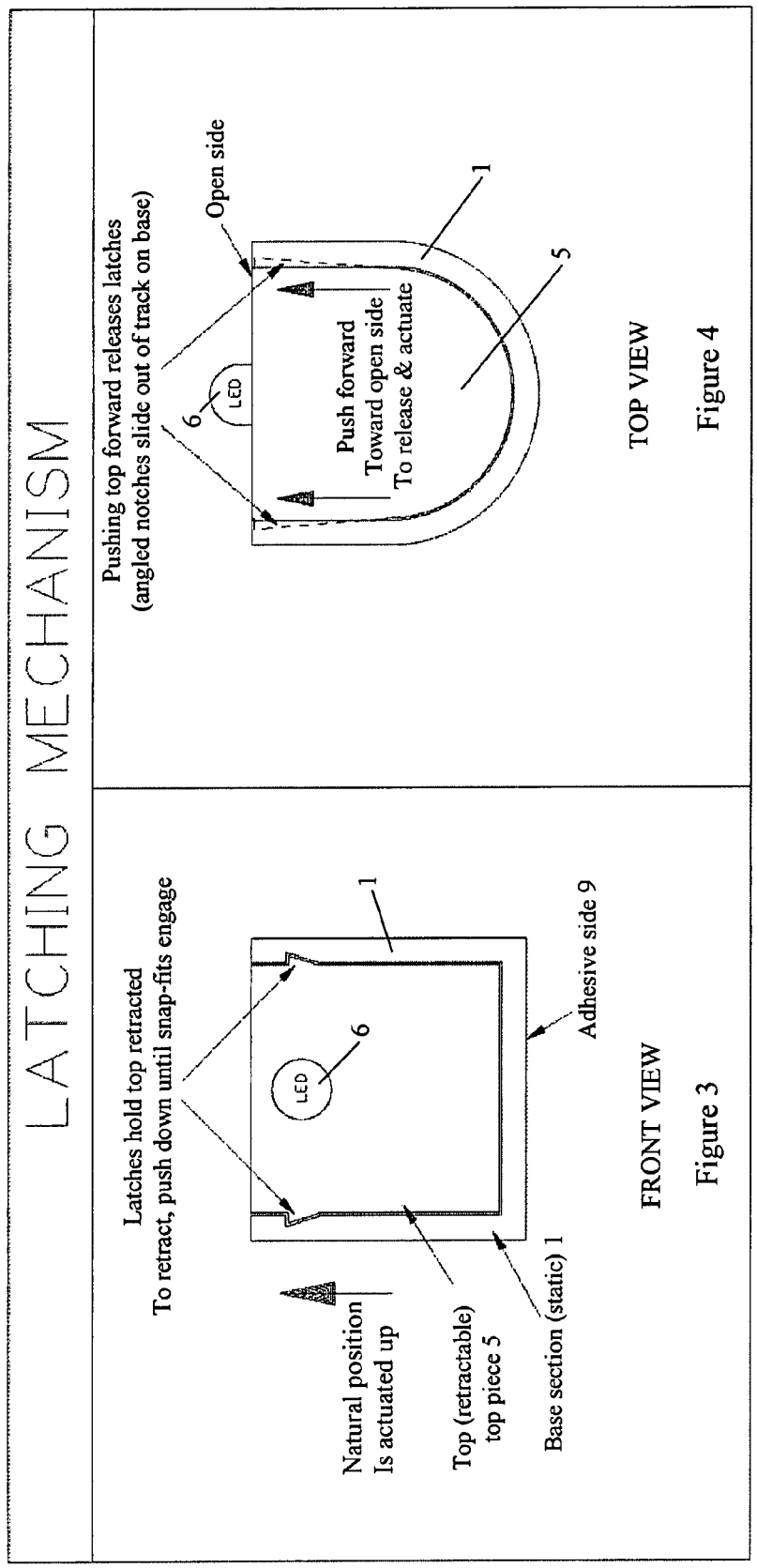

LIGHT STRUCTURE FOR ATTACHMENT TO INPUT/OUTPUT DEVICE

RELATED APPLICATION/CLAIM OF PRIORITY

This application is related to and claims the priority of Provisional Application No. 60/842,964, filed Sep. 8, 2006, and entitled Clicker Microlite; which provisional application is incorporated by reference herein.

BACKGROUND

The present invention relates to a new and useful light structure configured to be attached to an input/output panel, which receives input or displays information. The light structure is configured such that when attached to an input/output panel, it can selectively illuminate a predetermined portion of the input/output panel.

In applicants' experience, when people use input/output panels such as (a) remote control devices for televisions, CD players and other electronic equipment, (b) portable digital assistants (PDAs), (c) laptop computers, (d) cell phones, etc., they often use those input/output devices in conditions where the panels (that need to be operated to enter information that is used with the electronic equipment) are operated in low light conditions (or even substantially dark conditions) that makes entry of information via the panels difficult, and irritating to the user.

In addition, applicants understand that many people fumble with their remote control panels while watching movies and television in the dark. Moreover, some panels that form input/output devices (e.g. TV remote control devices) may have some backlight associated with the individual buttons of the panels to enable some of their buttons to be internally viewed, but may not provide the user with a full illumination of the panel. Thus, while the backlight devices may provide some help, a large part of the remote control panel (whose buttons may be small) remains subject to the surrounding lighting, and that may not be adequate to enable the user to conveniently operate a number of important control features of the electronic equipment.

Still further, with most electronic equipment, applicants believe the ease of operation of the illumination device, the effectiveness of the illumination device and the cost of the illumination device are generally important commercial considerations. Moreover, applicants believe there is a need for illumination devices that are "aftermarket" type devices, that are cost effective, can be attached to an input/output panel for a piece of electronic equipment, are easy and efficient to use, and designed to effectively illuminate a predetermined area of the input/output panel

SUMMARY OF THE INVENTION

The present invention provides a new and useful lighting concept, designed especially for input/output panels that are often operated in less than favorable ambient lighting conditions. The principles of the present invention are particularly useful with portable input/output panels (i.e. input/output panels such as (a) remote controls, (b) PDA's, (c) laptop computers, (d) cell phones, etc. that are intended to be carried about by a user and operated in the ambient lighting conditions about the user).

In addition, the lighting concept of the present invention is particularly configured as an "aftermarket" type of device, which can be selectively attached to an input/output panel, and configured to easily, effectively and conveniently direct light to illuminate a predetermined area of the input/output panel.

Moreover, an illumination device for an input/output panel, according to the principles of the present invention, is designed to be easy and efficient to attach to the panel and to operate, effective to illuminate the panel (or at least the part of the panel that needs to be illuminated in order for the panel to be conveniently operated, and is designed to be cost efficient to commercially exploit.

An illumination device according to the principles of the present invention is designed to be integrally connected with an input/output panel and is selectively actuatable from a retracted position to an active position in which it directs light over a predetermined portion of the panel. The illumination device can be made relatively small (with a footprint about the size of a small coin), is very compact when in the retracted position because it collapses inside of itself with a significant reduction of total product volume, and can be easily actuated by a simple manual movement. When actuated, the illumination device is extended to a position in which the illumination source is spaced above the panel, and is oriented to direct light at the panel that illuminates the entire panel, or at least a predetermined portion of the panel that is sufficient to enable the user to fully operate the panel.

In a preferred design, the illumination panel has a retracted position in which an illumination source is in an off condition and is located in close proximity to the panel and an active position in which the illumination source is in an on condition in which it is spaced above the panel and directs light at the panel that illuminates a predetermined portion of the panel. When in the retracted position, the illumination device is compact, and takes up relatively small space on the panel. However, when activated, the illumination device is projected (extended) a predetermined distance above the panel, and illuminates the entire panel, or a large enough portion of the panel to enable the user to fully and conveniently operate the panel.

In its most preferred form, the illumination device includes a light emitting diode (LED) to illuminate the selected portion of the panel when the illumination device is in its active position. Moreover, the illumination device is designed to be integrally connected with the panel, so that the illumination device is always available to illuminate the panel.

Other features of the present invention will become further apparent from the following detailed description and the accompanying drawings and exhibits.

BRIEF DESCRIPTION OF THE DRAWINGS AND EXHIBITS

FIG. 3 is a schematic front view of a portion of the illumination device, showing the manner in which the illumination device is held in a retracted position on the panel;

FIG. 4 is a schematic top view of a portion of the illumination device, showing the manner in which the illumination device is manipulated to release the illumination device from its retracted position;

Figure 7:
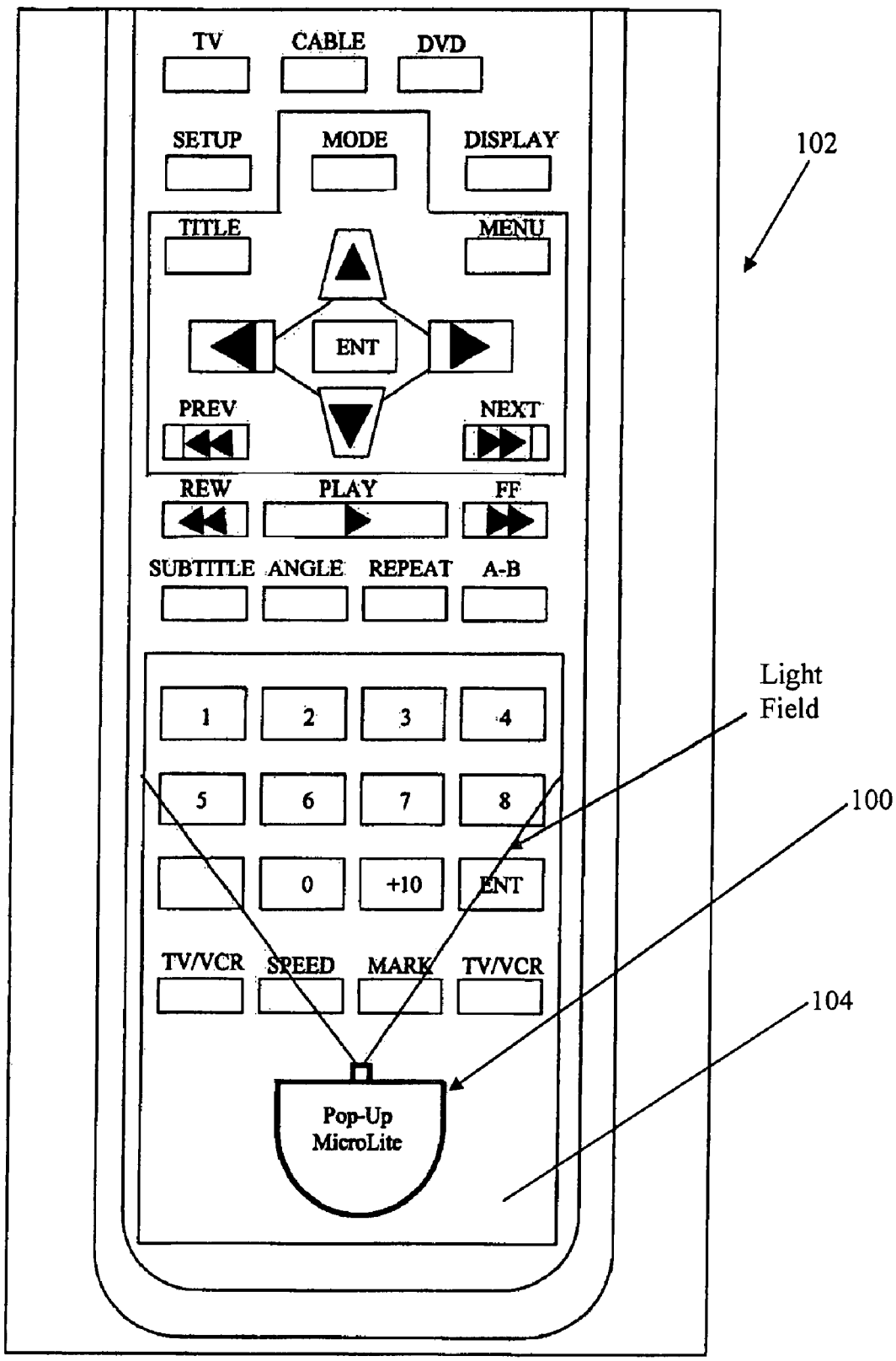
Figure 8:
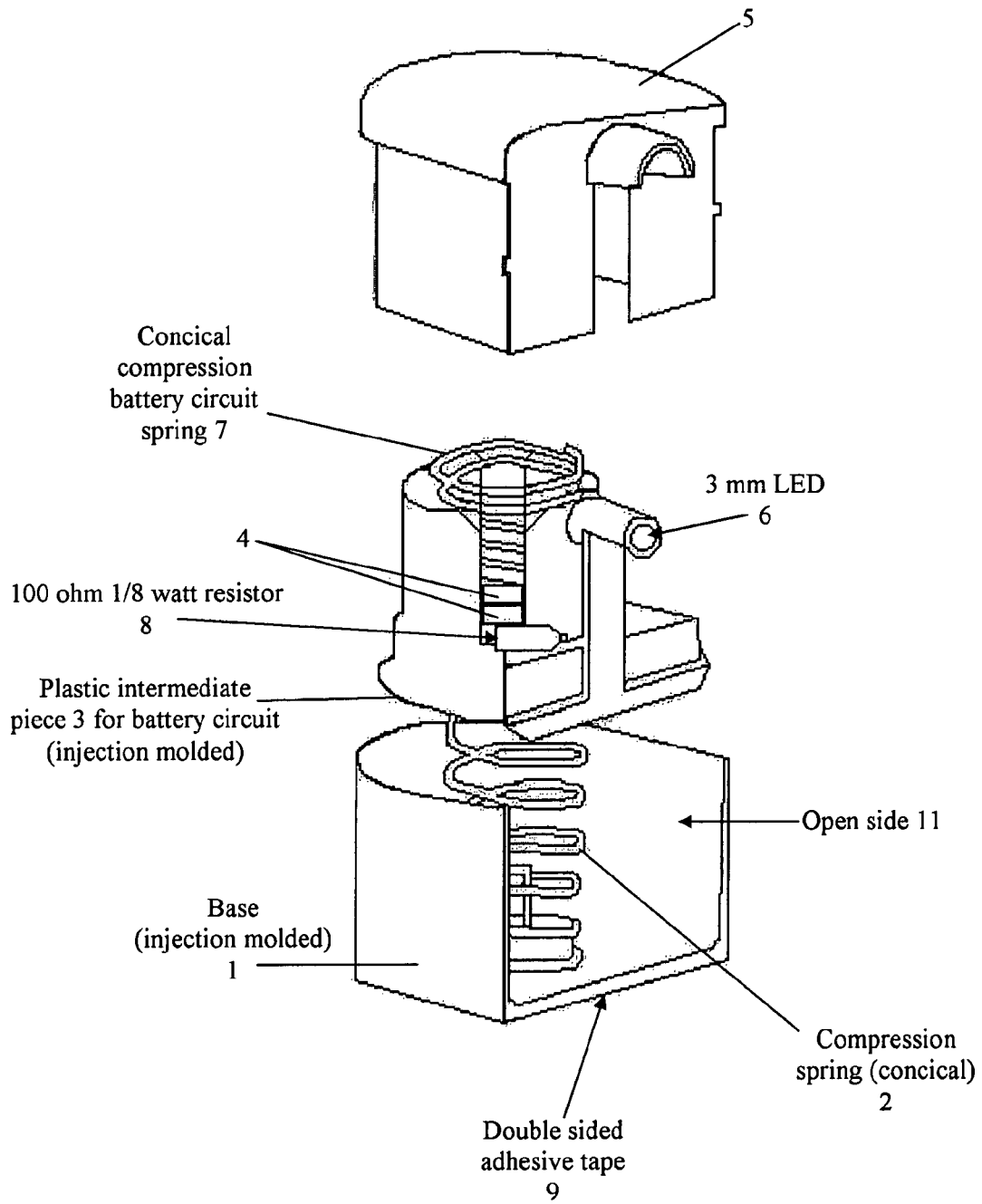

FIG. 7 is a schematic illustration of the top of a panel with an illumination device according to the present invention, and schematically showing the manner in which the illumination device illuminates the panel, according to the principles of the present invention; and FIG. 8 is a schematic, exploded illustration of the components of an illumination device, according to the principles of the present invention.

Exhibit A is a grayscale image of schematic, exploded illustration of the components of an illumination device shown in FIG. 8; and Exhibit B is an illustration similar to FIG. 7, and showing the field of illumination provided to the panel by the illumination device of the present invention.

DETAILED DESCRIPTION

As discussed above, the present invention relates to a new and useful illumination device, designed especially for input/output panels that are often operated in less than favorable ambient lighting conditions. The principles of the present invention are described below in connection with an illumination device for a remote control device for a television, but from that description, the manner in which the principles of the present invention can be applied to produce illumination devices for various types of input/output panels, will be apparent to those in the art.

Initially, it should be noted that in this application an "input/output panel" means any form of remote control device, keyboard, keypad, touch screen, display screen, etc, that enables a user to enter information into an electronic device or view information being communicated to the electronic device.

Figure 1:
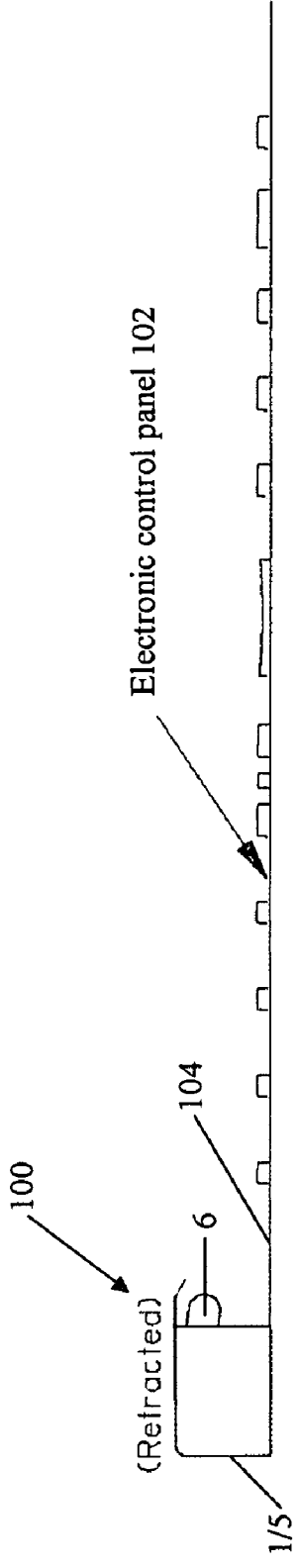
FIG. 1 is a schematic illustration of an input/output panel of an electronic device, with an illumination device, according to the present invention, integrally attached to the panel, and in a retracted position.
Figure 2:
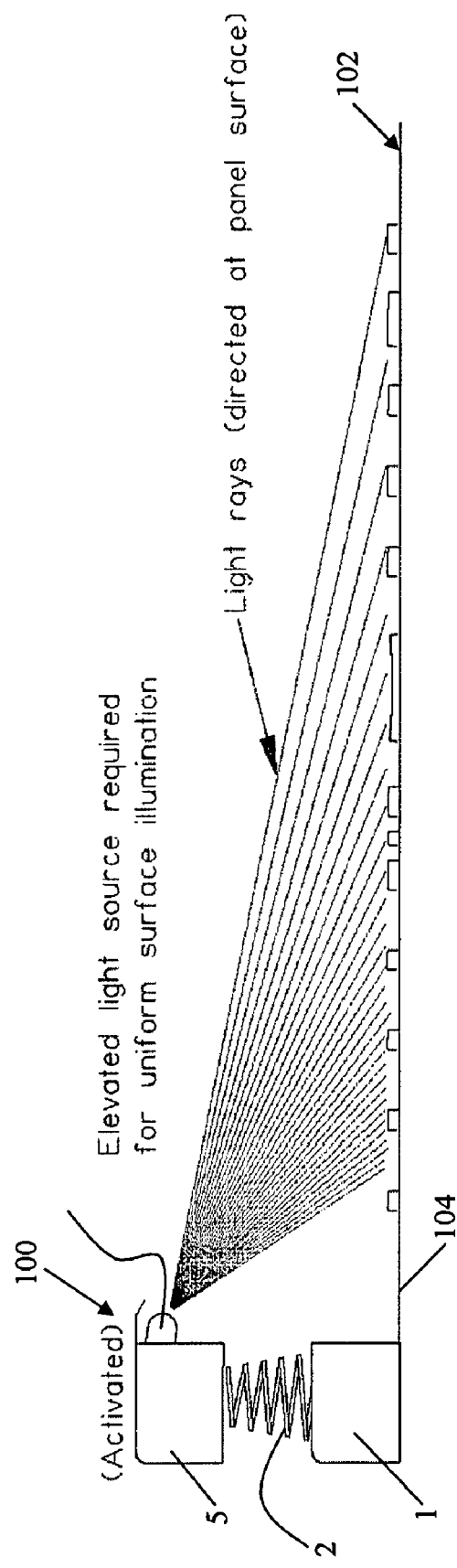
FIG. 2 is a schematic illustration of the input/output panel of FIG. 1, with the illumination device in an active (elevated) position in which it illuminates a predetermined portion of the panel, according to the principles of the present invention.

As illustrated in FIGS. 1 and 2, an illumination device 100 according to the principles of the present invention, is configured to be attached to an input/output panel 102, and preferably to the surface 104 of the input/output panel. The illumination device 100 has a retracted position shown in FIG. 1, and an active position, shown in FIG. 2. When the illumination device is in the active position, the illumination device 100 has an illumination source 3 designed to direct light at the surface 104 of the panel, in the manner schematically shown in FIGS. 2, 7 and Exhibit B. The field of the illumination source 3 is designed such that the source 3 will direct light to illuminate a predetermined portion of the panel 102.

The illumination device 100, when attached to the panel 102 has a retracted position (FIG. 1) in which the illumination source 3 is in an off condition, and an active position (FIGS. 2, 7, Exhibit B) in which the illumination source 3 is in an on condition in which it directs light that illuminates a predetermined portion of the panel 102. The illumination device 100 is configured to be selectively manipulated by a user to cause the illumination device to move from the retracted position to the active position, as described further below.

The illumination device 100 is configured such that the illumination source 3 is maintained in relatively close proximity to the surface 104 of the panel 102 when the illumination source is in the retracted position (see e.g. FIG. 1). When the illumination device 100 is in the active position, the illumination source 3 is extended above the surface 104 of the panel 102 and oriented to project light in a downward direction to illuminate a predetermined portion of the panel 102 (see, e.g. FIGS. 2, 7 and Exhibit B).

The illumination device 100 is spring biased to the active position (e.g. by a compression spring 2). The illumination device is manually manipulated to the retracted position and is configured to be held in the retracted position until manually manipulated to a condition in which it can move under its spring bias to the active position.

The illumination source 3 is preferably a light emitting diode (LED) 3, e.g. a 3 mm LED, to illuminate the predetermined portion of the panel when the illumination device is in its active position.

The illumination device 100 is configured to be integrally attached to the panel 102, in a manner such that the illumination device is maintained attached to the panel and is available to illuminate the panel until the illumination device is intentionally removed from the panel. Preferably, the illumination device is adhesively attached to the surface 104 of the panel 102 that has the input/output structure that needs to be illuminated to enable a user to effectively operate the panel. For example, the underside 9 of the illumination device can have a double sided adhesive tape to attach the illumination device to the surface of the panel. Of course while double sided adhesive tape is currently preferred, other ways of attaching the illumination device to the panel will occur to those in the art.

The illumination device has a relatively small footprint, about the size of a penny (e.g. with a maximum extent in any direction of less than 1 inch), so that it takes up relatively little of the available space on the surface of the panel 102. In addition, the illumination device is compact in the sense that when the illumination device is in the retracted position the illumination extends about ⅝" above the surface of the panel (Also, it is worth noting that when the illumination device is in the active position, the illumination source extends about 1.5" above the surface of the panel, and that height preferably ranges from 1" to 2").

The illumination device 100 is designed such that the illumination source 6 is automatically switched to an "on" condition when the illumination device is in an active position, and is automatically switched to an "off" condition when the illumination device is in a retracted position. The illumination device 100 comprises (a) a base 1 that is configured to be attached to the surface 104 of a panel. The base 1 supports a compression spring 2 for moving the illumination device to an active position. An intermediate battery circuit support member 3 is configured to fit inside the base 1, and supports electric battery circuit components that turn the illumination source 6 to an on condition with the illumination device is in an active position and turn the illumination source to an off condition when the illumination device is in the retracted position. The illumination device includes a top piece 5 that includes the illumination source 6 and is configured to fit about the intermediate member 3 and into the base 1, and be retained partially within the base 1 when the illumination device is in its retracted position. The top piece 5 is configured to compress the compression spring 2 within the base 1 when the illumination device is in its retracted position, and the top piece 5 is configured to be manipulated to a position that it is not retained within the base and allows the compression spring 2 to move the top piece 5 and the illumination source 6 to the active position.

Figure 5:
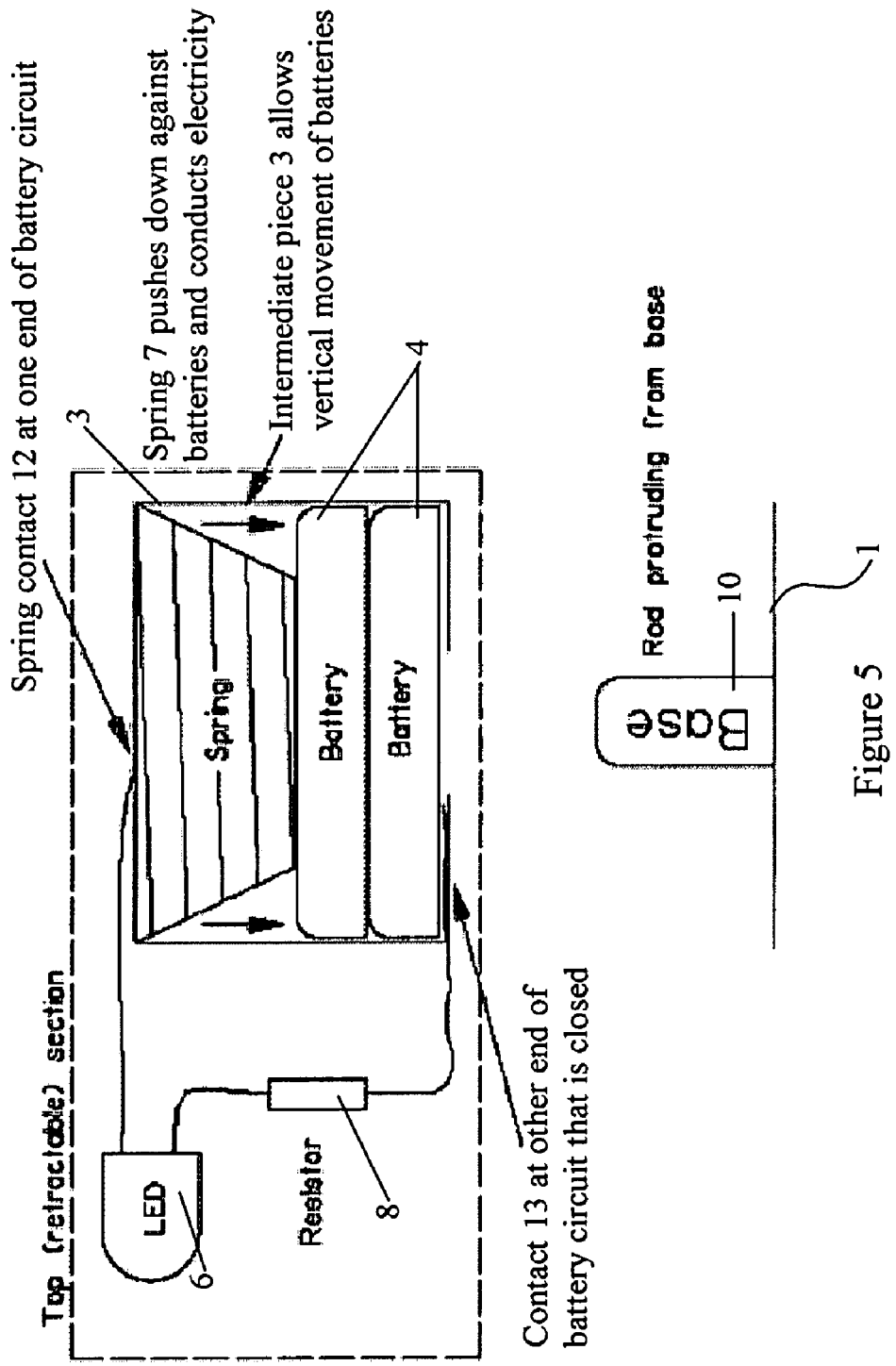
FIG. 5 is a schematic illustration of the illumination device in an actuated position, and showing how the light circuit is turned on as the device reaches its actuated position.
Figure 6:
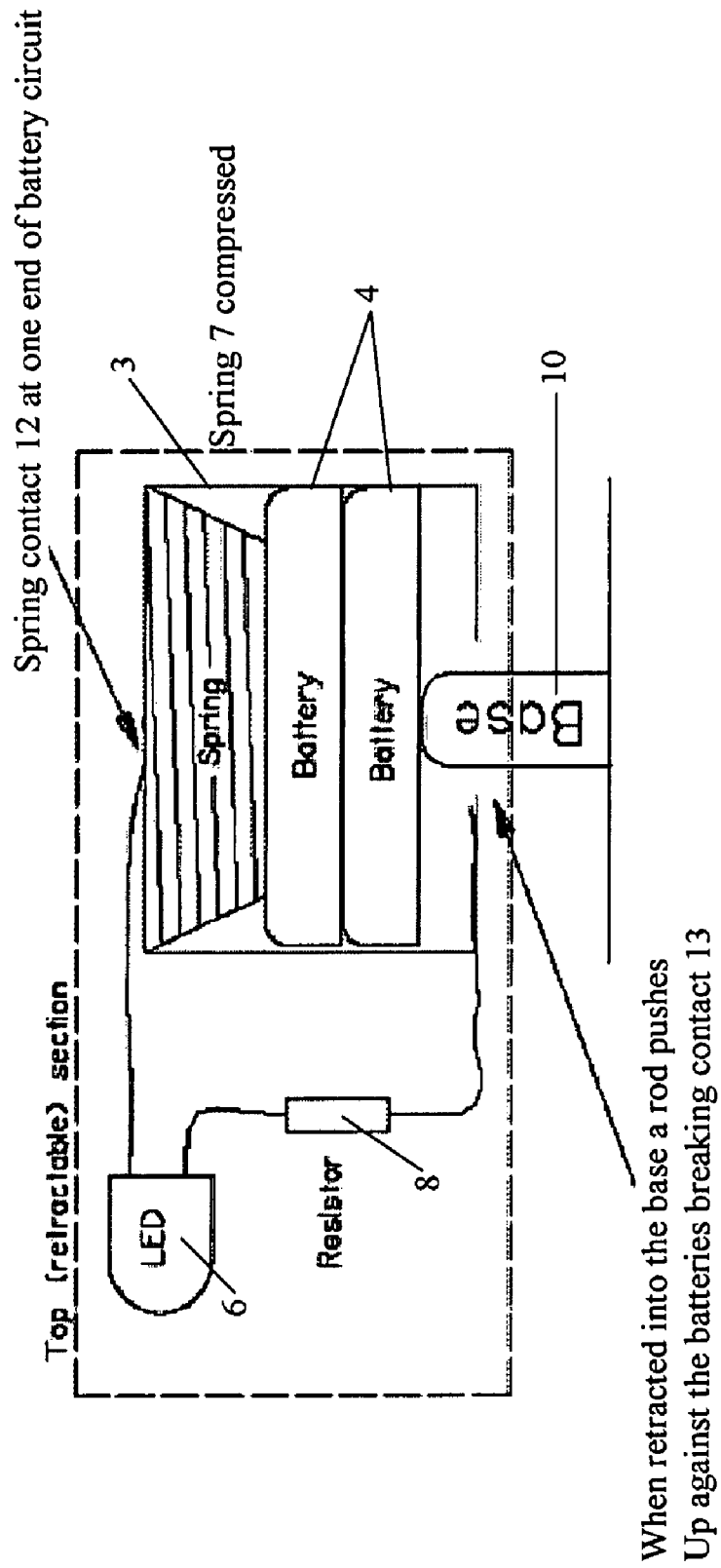
FIG. 6 is a schematic illustration of the illumination device in a retracted position, and showing how the light circuit is turned off as the device is manipulated to its retracted position.

As shown in FIGS. 5 and 6, the battery circuit comprises a pair of batteries 4, a compression spring 7 made of conducting material, a resistor 8, an upper spring contact 12, and a lower contact 13. The compression spring 7 acts between the batteries 4 and the upper spring contact 12, and maintains electrical contact between the batteries 4 and the upper spring contact 12. The compression spring 7 exerts a downward bias on the batteries 4, that biases the batteries into contact with the lower contact 13. When the illumination device is in an active position, the compression spring 7 biases the batteries 4 against the lower contact 13 and completes the battery circuit to turn the illumination source 6 to an on condition (FIG. 5). The base 1 includes a rod 10 that acts on the batteries, against the bias of spring 7, and compresses the spring as it pushes the batteries out of contact with the lower contact 13, to open the battery circuit when the illumination device is in the retracted position (FIG. 6). Thus, the battery circuit is closed when the illumination is in the active position, and is opened when the illumination device is in the retracted position.

The illumination device 100 is manipulated from the active position of FIG. 2 to the retracted position of FIG. 1, by manually pressing downward on the top piece 5 so that the top piece is pressed into the base 1. When the top piece 5 is pressed downward and into the base 1, the battery circuit is also pressed downward into the base 1, and the base 10 presses upward on the batteries 4, to open the battery circuit, in the manner described above. In addition, as the top piece 5 is pressed into the base 1, compression spring 2 is compressed, and the outside wall of the top piece 5 has a snap fit engagement with the inside of the base 1 (see FIG. 3), to hold the top piece 5 in the base 1, with the illumination source 6 in an off condition. In order to manipulate the illumination device to its active position, the top piece 5 is pushed laterally along the base (see FIG. 4), through an opening 11 in one side of the base. When the top piece 5 has been pushed laterally out of the base 1, the compression spring 2 is released, and moves the top piece (with the illumination source 6) to the position of FIG. 2, where the illumination source 6 is spaced above the surface 104 of the panel 102. Moreover, as the compression spring 2 moves the top piece 5 and illumination source 6 upward, the intermediate piece 3 that supports the battery circuit moves upward and away from the base 10, thereby allowing compression spring 7 to bias the batteries 4 against the lower contact 13, to complete the battery circuit and turn the illumination source to an on condition.

Thus, the illumination source 100 is configured such that the spring loaded battery circuit, which is primarily supported by the intermediate piece 3, will close and turn the illumination source 6 to an on condition when the illumination device is in its active position, and will open to turn off the illumination source 6 when the illumination device is in its retracted position. Specifically, when the illumination device is manipulated to its active position, the compression spring 7 presses the batteries 4 against the lower contact 13 and completes the battery circuit to turn the illumination source 6 to an on condition. When the illumination device is manipulated to its retracted position, as the top piece 5 is pressed into the base 1, the intermediate piece 3 is also pressed into base 1, and the rod 10 acts on the batteries 4, to compress the spring 7 and open the battery circuit, to place the illumination source 6 in an off condition.

Thus, as will be appreciated by those in the art, the illumination device of the present invention has a number of features that make it an effective aftermarket device, that is simple and efficient to assemble and use, effective to illuminate a predetermined portion of a panel, and cost efficient to produce. More specifically, a. The illumination device has a footprint about the size of a penny.
b. The top piece 5, the base 1 and the intermediate piece can each be made of injection molded resin (plastic).
c. The compression springs 2, 7 can be, e.g., conical compression springs.
d. The batteries 4 can be, e.g. CR 1225 coin cell batteries.
e. The resistor 8 can be, e.g. a 100 ohm ⅛ watt resistor.
f. The illumination source 6 can be, e.g. a 3 mm LED.
g. The illumination device has two positions: closed (off) and up (on). When closed the top piece 5 with the LED light source is held down by a snap fit with the base 1. A simple one-finger push releases the snap allowing the top piece 5 and the LED light source to pop up. To release the snap fit the top piece 5 is be pushed laterally towards the open side 11 of the base piece 1. To manipulate the illumination device to a retracted position, a user presses down on the top piece 5 head until it snaps into the base (1).
h. When the illumination device is in an active position, the battery spring (7) pushes down against the batteries (4) causing contact to be made with the lower contact 13, to close the battery circuit. When the illumination device is manipulated to its retracted position the rod 10 on the base pushes the batteries 4 up thus breaking contact with the lower contact, thereby opening the battery circuit and turning off the LED illumination source (6).
i. The illumination device is configured to be attached to a predetermined area of the surface 104 of a panel that is intended to be illuminated when the illumination source is in an on condition, and the illumination device is configured to be moveable in opposite directions (generally linearly) toward and away from the predetermined surface area of the panel, as the illumination device moves between its retracted and active positions, respectively
j. In the assembly of the illumination device, the LED illumination source 6 is inserted into the top or head piece 5. The battery spring 7 is inserted against the spring contact 12. The resistor 8 is attached to the intermediate piece 3 that supports the battery circuit. The batteries 4 are inserted between the battery spring 7 and the lower contact 13. The intermediate piece 3, with the battery circuit elements described above, is then inserted into the top piece 5. The resistor 8 is connected to the LED 6 to complete the battery circuit. The small end of the compression spring 2 is connected to the base 1, and larger end of the spring 2 is attached to the assembled top and intermediate pieces 5, 3, The double sided adhesive tape can then be attached to the bottom of the base 1.
k. For promotional applications the color(s) will be customized for the customer. The highly visible area on the top may be used for company logos while the area on the sides may be used for additional printing (slogans, contact info, etc). Having the top glow in the dark is also an optional feature.
l. Simple, low-cost 3-piece plastic design uses only standard components
m. The illumination device of the present invention is also believed to be a great promotional product—companies can literally put their message in the hands of their customers.
n. Applicants' market research indicates a retail price of $4.99 to $6.99.

With the foregoing disclosure in mind, it is believed that various adaptations of an illumination device, according to the principles of the present invention, will be apparent to those in the art.

The invention claimed is:

1. An apparatus comprising
a. an illumination device that is configured to be attached to an external surface of an input/output panel, and b. the illumination device having an illumination source that can be actuated to an on condition to illuminate a predetermined portion of the external surface of the panel to which the illumination device is configured to be attached;

wherein the illumination device has a retracted position in which the bottom of the illumination device is maintained substantially flush with the external surface of the panel when the illumination source is in an off condition, and the illumination device has an active position in which the illumination source can be actuated to an on condition, the illumination device is extended to a position in which it the illumination device is spaced above the panel and the illumination source is oriented to project light in a downward direction to illuminate a predetermined portion of the external surface of the panel to which the illumination device is configured to be attached, and wherein the illumination device is configured so that when in the retracted position the total external volume of the apparatus is significantly reduced (more compact) as compared to its volume when in the actuated position.

2. The apparatus of claim 1, wherein the illumination source includes a light emitting diode (LED) to illuminate the predetermined portion of the external surface of the panel to which the illumination device is configured to be attached when the illumination source is in its active position.

3. The apparatus of claim 2, wherein the illumination device is configured to be attached to the external surface of the panel, in a manner such that the illumination device is maintained attached to the external surface of the panel and is available to illuminate the predetermined portion of the external surface of the panel to which the illumination device is configured to be attached until the illumination device is intentionally removed from the external surface of the panel.

4. The apparatus of claim 3, wherein the illumination device is configured to be universally attached directly to the external surface of the surface to be illuminated of any input/output panel that has at least 1 sq·in of surface area available.

5. The apparatus of claim 4, wherein the illumination device is configured to be adhesively attached to the external surface of the panel to which the illumination device is configured to be attached.

6. The apparatus of claim 5, wherein the illumination device is configured such that the illumination source is automatically switched to an on condition when the illumination device is in an active position, and is automatically switched to an off condition when the illumination device is in a retracted position.

7. An apparatus comprising
   a. an illumination device that is configured to be attached to an external portion of an input/output panel, and
   b. the illumination device having an illumination source that can be actuated to an on condition to illuminate a predetermined portion of the panel;
wherein the illumination device
   a. has a retracted position in which the illumination source is maintained in relatively close proximity to a panel in an off condition, and the illumination device has an active position in which the illumination source can be actuated to an on condition, is extended to a position in which it is spaced above the panel and oriented to project light in a downward direction to illuminate a predetermined portion of the panel, and wherein the illumination device is configured so that when in the retracted position the total external volume of the apparatus is significantly reduced (more compact) as compared to its volume when in the actuated position, b. includes a light emitting diode (LED) to illuminate the predetermined portion of the panel when the illumination source is in its active position,
   c. is configured to be integrally attached to the panel, in a manner such that the illumination device is maintained attached to the panel and is available to illuminate the panel until the illumination device is intentionally removed from the panel,
   d. is configured to be universally attached directly to the surface to be illuminated of any input/output panel that has at least 1 sq·in of surface area available,
   e. is configured to be adhesively attached to a surface of a panel,
   f. is configured such that the illumination source is automatically switched to an on condition when the illumination device is in an active position, and is automatically switched to an off condition when the illumination device is in a retracted position,
   g. comprises
      i. a base that is configured to be attached to the surface of a panel, the base having a compression spring for moving the illumination device to an active condition,
      ii. an intermediate support member that fits inside the base, and supports a battery circuit that is in an open condition when the illumination device is in its retracted condition and is in a closed condition when the illumination device is in its active condition, and
      iii. a top piece that includes the illumination source and is configured to fit and be retained partially within the base when the illumination device is in its retracted position, the top piece configured to compress the compression spring within the base when the illumination device is in its retracted condition, and the top piece configured to be manipulated to a position that it is not retained within the base and allows the compression spring to move the top piece and the illumination source to the active condition.

8. The apparatus of claim 7, wherein the base includes a rod that is configured to open the battery circuit when the illumination device is in the retracted position, and enables the battery circuit to close when the top piece and the illumination source are moved to the active position.

9. The apparatus of claim 8, wherein the illumination device is spring biased to the active position, and the illumination device is configured to be held in the retracted position against the spring bias, and part of the illumination device is manipulated to a position in which the illumination device can move under the spring bias to the active position.

10. The apparatus of claim 9, wherein a spring loaded battery portion is configured to complete a circuit that turns the illumination source to an on condition, and wherein the illumination device is configured to manipulate the spring loaded battery portion to open the circuit and turn the illumination source to an off condition when the illumination device is manipulated to the retracted position.

11. The apparatus of claim 10, wherein the spring loaded battery portion is biased in a downward direction to close the circuit, and an extension device is provided that acts on the spring loaded battery portion to compress the spring loaded battery portion and open the circuit when the illumination device is in its retracted position.

12. An apparatus comprising
   a. an illumination device that is configured to be attached to an external surface portion of an input/output panel, and
   b. the illumination device having an illumination source that can be actuated to an on condition to illuminate a predetermined portion of the surface of the panel to which the illumination device is configured to be attached;

wherein the illumination device has a retracted position in which the bottom of the illumination device is maintained substantially flush with the panel in an off condition, and the illumination device has an active position in which the illumination source can be actuated to an on condition, is extended to a position in which it is spaced above the panel and oriented to project light in a downward direction to illuminate a predetermined portion of the panel, and wherein the illumination device is configured to be attached to a predetermined area of a surface of an input/output panel that is intended to be illuminated when the illumination source is in an on condition.

13. The apparatus of claim 12, wherein the illumination device is configured to be moveable in opposite directions toward and away from the predetermined surface area of an input/output panel, as the illumination device moves between its retracted and active positions, respectively.

14. A method of illuminating a portion of an input/output panel comprising
  a. providing an illumination device that is attached to an external surface of the input/output panel, the illumination device having an illumination source that can be actuated to an on condition to illuminate a predetermined portion of the external surface of the input/output panel to which the illumination device is attached; the illumination device being in a retracted position in which the bottom of the illumination device is substantially flush with the input/output panel in an off condition, and the illumination device being selectively moveable to an active position in which the illumination device is extended to a position in which it is spaced above the external surface of the input/output panel to which the illumination device is attached and oriented to project light in a downward direction to illuminate a predetermined portion of the external surface of the input/output panel to which the illumination device is attached and in which the illumination source is actuated to an on condition; and
  b. selectively moving the illumination device from the retracted position to the active position in which the illumination device is spaced above the external surface of the input/output panel and oriented to project light in a downward direction to illuminate a predetermined portion of the external surface of the input/output panel to which the illumination device is attached, and actuating the illumination source to an on condition.

15. The apparatus of claim 6, wherein the illumination device comprises (a) a base that is configured to be attached to the external surface of the surface of a panel to which the illumination device is configured to be attached, the base having a compression spring for moving the illumination device to an active condition, (b) an intermediate support member that fits inside the base, and supports a battery circuit that is in an open condition when the illumination device is in its retracted condition and is in a closed condition when the illumination device is in its active condition, and (c) a top piece that includes the illumination source and is configured to fit and be retained partially within the base when the illumination device is in its retracted position, the top piece configured to compress the compression spring within the base when the illumination device is in its retracted condition, and the top piece configured to be manipulated to a position that it is not retained within the base and allows the compression spring to move the top piece and the illumination source to the active condition.

* * * * *

UNITED STATES PATENT AND TRADEMARK OFFICE
CERTIFICATE OF CORRECTION

PATENT NO. : 7,794,131 B2  Page 1 of 1
APPLICATION NO. : 11/852171
DATED : September 14, 2010
INVENTOR(S) : John C. Teel and Jessica E. Teel It is certified that error appears in the above-identified patent and that said Letters Patent is hereby corrected as shown below:

In column 7, line 12, the word "it" should be removed so that the line reads as follows:

"device is extended to a position in which the illumination"

Signed and Sealed this

Fourteenth Day of December, 2010

David J. Kappos
*Director of the United States Patent and Trademark Office*